Dec. 2, 1930.                H. G. TRAVER                1,783,268
                      AMUSEMENT RIDE AND CAR THEREFOR
                  Filed May 22, 1929          2 Sheets-Sheet 2
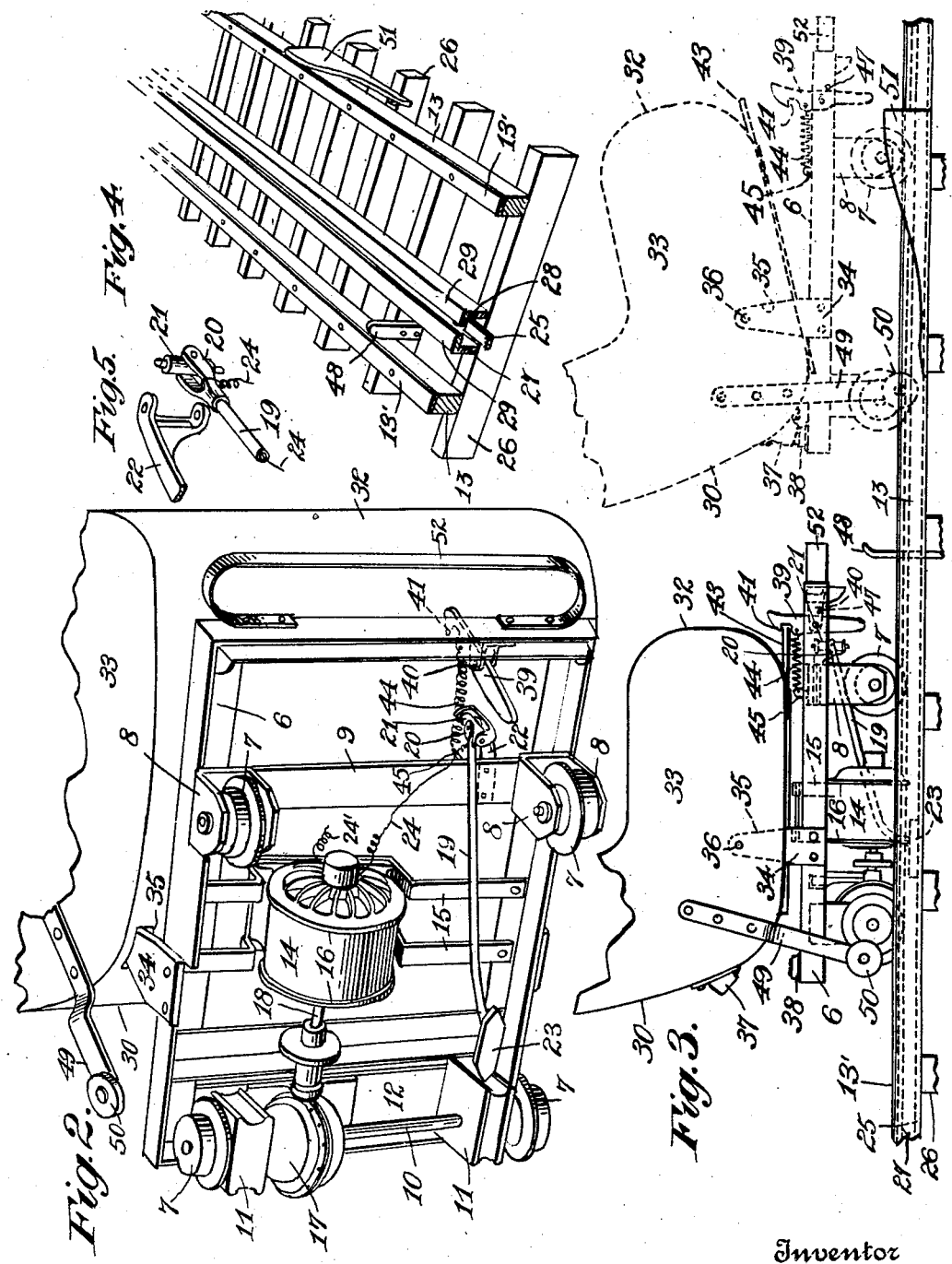
Inventor
H.G.Traver
By his Attorney
John O. Seifert Patented Dec. 2, 1930

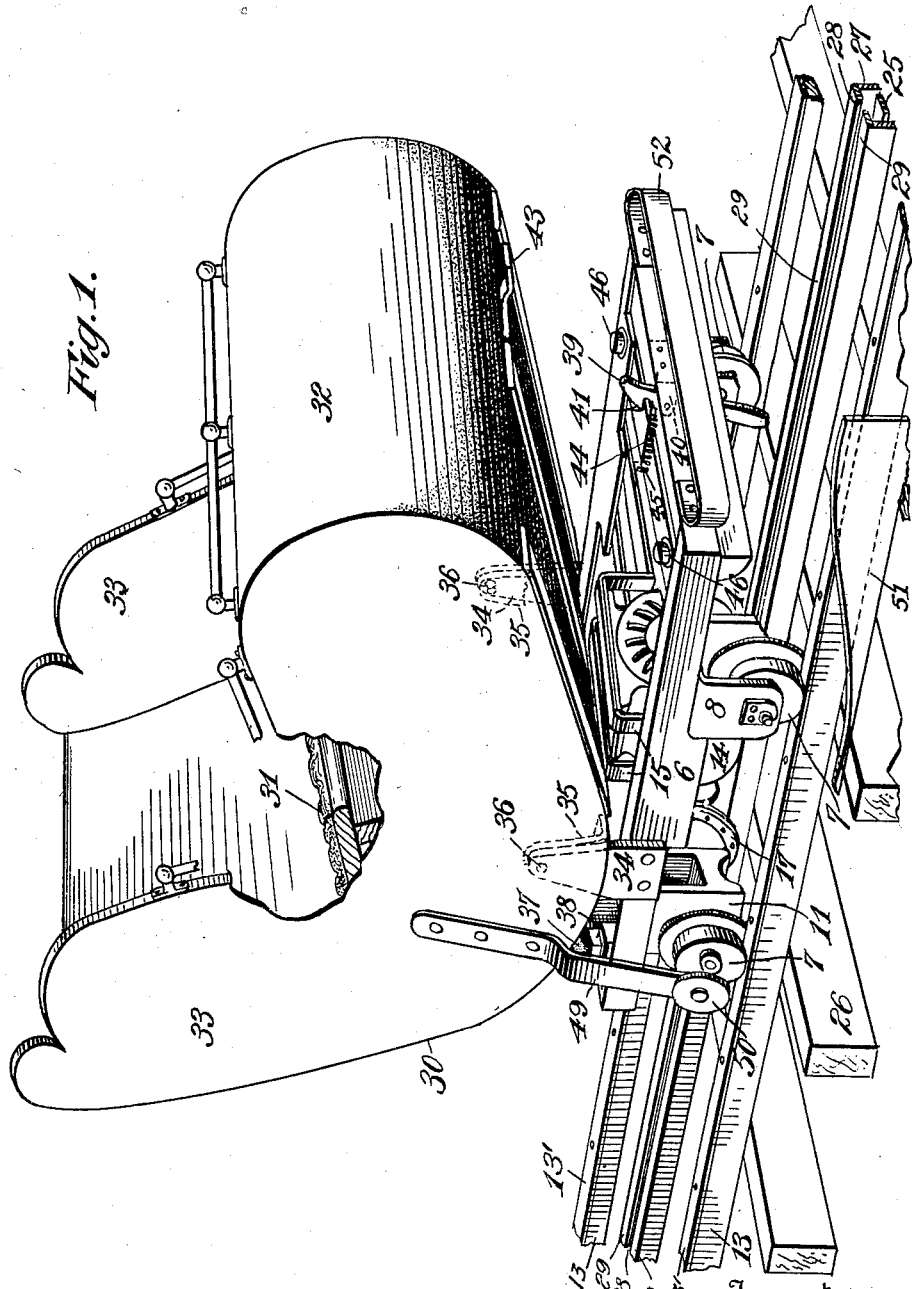

1,783,268

UNITED STATES PATENT OFFICE

HARRY G. TRAVER, OF BEAVER FALLS, PENNSYLVANIA

AMUSEMENT RIDE AND CAR THEREFOR

Application filed May 22, 1929. Serial No. 364,987.

This invention relates to passenger carrying cars used in connection with amusement rides and relates particularly to the mounting of a car body on a traction supported frame.

It is an object of the invention to provide a car body mounting to permit of the body to have tilting movement relative to the traction supported frame and urge the body to a position in a plane inclining to the frame.

It is another object of the invention to provide means to releasably retain the body in a predetermined position relative to the frame so that passengers may be seated therein in an upright position and as the body is tilted forced to assume any inclining position.

It is still another object of the invention to provide a track structure arranged with means to successively actuate the car body releasing means and permit the body to tilt and then move the body to a predetermined position relative to the supporting frame and the passengers to upright seated position.

It is a further object of the invention to provide the car with power means carried thereby to propel the car along the track structure which is simple and inexpensive to apply.

It is a further object of the invention to provide bumper means to limit the movements of the body.

It is a still further object of the invention to provide electric translating and contact means universally carried by the car frame to engage an enclosed electric conductor mounted on the track structure.

Further objects and advantages will hereinafter appear.

In carrying out the invention there is provided a frame for a passenger carrying car tractionally supported upon rails of a track structure of any desirable construction by flanged wheels rotatably mounted in suspended relation to the frame and operatively connected to an electric motor carried by the frame adapted to be connected in circuit with a source of electricity by conductor means electrically connected to the motor and universally carried by the frame to make wiping contact with an enclosed electric conductor mounted on the track structure and connected in circuit with a source of electricity. A car body arranged with a transverse seat is pivotally mounted on the frame in superposed relation thereto and eccentrically of the transverse center of the body whereby the body is urged by gravity to rearward tilted position and the passenger therein to assume a rearward reclining position from an upright seated position. The body is secured in a position whereby the passenger will be seated in an upright position by a latch member pivotally carried by the frame and yieldingly urged into engagement with a latch plate projecting from the body. The latch is released from the latch plate by engaging an abutment mounted on the track structure at a predetermined point in the travel of the car, whereupon the body will be tilted and passengers assume a reclined position limited by abutments fixed to the frame and body. It is necessary to have the passengers sitting in an upright position in order to leave the car with ease and this is accomplished by moving the body to position for engagement of the latch plate by the latch member by a roller carried by a lever arm fixed to the side of the body riding up a cam rail mounted at the outer side of one of the track rails successively to the latch engaging abutment relative to the travel of the car.

In the drawings accompanying and forming a part of this application, Figure 1 is a perspective view showing a passenger carrying car upon a portion of a track structure with a body portion partly broken away to show a seat, and tilted relative to the supporting frame of the car body.

Figure 2 is a perspective view looking at the bottom of the car, only a portion of the body being shown.

Figure 3 is a view of the car in side elevation showing the body in an upright position in full lines and the body of an adjacent car released and in tilted position in dotted lines and showing the means to effect the positioning of the car body.

Figure 4 is a perspective view of a portion of the track structure showing an electric conductor in relation to the track rails; and Figure 5 is a detail view in perspective of the mounting of an electric contact shoe, as shown in Figure 2.

Like characters of reference designate like parts throughout the different views of the drawings.

In carrying out the invention as illustrated there is provided a frame member 6 of rectangular shape tractionally supported by flanged wheels 7, two pairs in the present instance, with the front wheels rotatably supported in U-brackets 8 fixedly suspended from the bottom of a cross-piece 9 of the frame, and the rear wheels carried by an axle 10 rotatably mounted in bearing brackets 11 suspended from a plate 12 extending transversely of the bottom of the frame, the wheels, brackets and cross-piece being of electrical conducting material. The car is propelled upon rails comprising a supporting body 13 of wood and of rectangular shape in cross-section having a metallic traction and wear resisting strip 13' fixed to the top of the supporting body, as is usual in railway structure of amusement rides by the driving of the rear wheels by an electric motor 14 suspended from the frame by U-shaped brackets or bands 15 fixed at the ends thereof to the sides of the frame, and straps 16 encircling the motor with the ends anchored to the brackets. The motor is operatively connected to the axle 10 through differential gearing of usual construction interposed in said axle, illustrated in a general way at 17, the casing of which is supported from the plate 12 and connected to the motor by a drive shaft 18, being an extension of the shaft of the motor. The motor is connected in circuit with a source of electricity through contact means comprising a tubular shaft or pole 19 arranged at one end with a bifurcated portion 20 pivotally mounted to have universal movement on a vertically extending pin 21 having reduced ends to rotatably engage perforations in the ears of a bifurcation of a bracket 22, supported from the cross-piece 9 to permit movement of the pole 19 in vertical and horizontal planes to compensate for irregular movements of the car during the travel thereof on the track. The shaft 19 at the free end has an electric contact making shoe 23 of greater width than the shaft 19 electrically connected to one terminal of the motor by a conductor 24 passing through the shaft 19, the motor being grounded in the frame through the other terminal thereof by conductor 24' connected either to the brackets 8 or cross-piece 9. The shoe is adapted to make rubbing contact as it is propelled by the travel of the car along the track with a conductor rail 25 supported by tie members 26 of non-conducting material of the track structure intermediate the track rails, said rail being arranged within an enclosure 27 also of non-conducting material arranged with a slot 28 at the top thereof for the passage of the shoe-carrying shaft 19 to prevent the shoe from leaving the rail. The top of the enclosure is formed of separate strips of material 29 secured upon edgewise arranged members constituting the side walls of the enclosure, the strips 29 being assembled thereon after the positioning of the shoe relative to the rail. The conductor rail 25 is electrically connected to one terminal of the source of electricity and the traction strips 13' of the track rails 13 are electrically connected to the opposite terminal of the source of electricity thereby completing the circuit of the motor through the wheels and the mounting means thereof.

For the carrying of passengers the car is arranged with a body portion 30 in the form of a parabola with one side of the parabola constituting the supporting back for a seat 31 extending transversely of the body and the other side of the parabola comprising the bottom and continuing forward and terminating in a curved direction to form a smaller parabola for the enclosed front of the body, as at 32. The sides of the body are enclosed by walls 33 secured to the edges of the body portion and one of said walls may be arranged with an opening having a door hingedly mounted relative thereto in a suitable manner.

To impart an unexpected sensation and thrill to the passengers the body is pivotally mounted on supports 34 fixed to and projecting upwardly from the side members of the frame 6 through openings 35 in the bottom and adjacent the sides of the body where the supports are pivotally connected to the body sides, as at 36. The pivotal connection is arranged on an axis extending transversely of the body and substantially parallelly to and in a vertical plane with the forward portion of the seat 31, whereby the center of gravity of the body with no passengers therein is such as to cause the body to assume a position as shown in full lines in Figure 3 with the bottom of the body parallel with the frame 6. However, with passengers seated in the car the weight of the passengers will effect a change in the center of gravity to the rear of the pivotal supports 34 and cause the body to assume a backward tilted position and the passengers to assume a reclining position, as shown in Figure 1. This backward tilting movement of the body is limited by a pair of stops or buffers 37 of resilient material, such as rubber, carried on the exterior of the back of the body adjacent each side thereof with the outer face extending in an oblique direction to the back, and the obliqueness of the angle depending upon the desired inclination the body is to assume. The buffers are adapted to engage a resilient face of correspondingly positioned abutments 38 fixed to the upper portion of the frame 6. The supports 34 are mounted intermediate the ends of the frames so that the tipping force of the body will not upset the car.

In order to facilitate the entrance to and exit of passengers from the car, and to permit passengers to assume an upright seated position at the commencement of the ride and at the termination thereof without a backward tilting of the car body, means are provided to releasably secure the car body in position with the bottom in parallel relation to the car frame 6, said means comprising a latch member 39 pivotally mounted intermediate the ends thereof in a bifurcation of a bracket 40 fixed to the inner side of the front end member of the frame 6, to have movement on an axis extending transversely of the longitudinal axis of the frame with the upper end heavier than the lower end to insure the movement of said end toward the rear of the frame 6 and having a notch 41 adjacent said end for engagement with a latch plate 43 fixed to and projecting forwardly from the bottom of the body by the lowering of the front of the body from a tilted position to a position where the bottom of the body is substantially parallel to the frame 6, the latch plate sliding over the beveled end of the latch to engage the notch. To further insure the engagement of the notch 41 with the plate 43 and retain it in such position the latch 39 is yieldingly urged in a direction to engage the latch plate by a spring 44 attached at one end to an ear 45 projecting up from the crosspiece 9 and the latch 39 intermediate its pivot support and the notch 41. The lowering of the front of the body is limited by the engagement thereof with resilient stops 46 mounted on the top of the side members and adjacent the front of the frame to relieve the body of shock and any undue strain thereof on the latch and plate. The movement of the latch in a direction toward the rear of the frame is limited to properly position the beveled end of the latch relative to the downward moving latch plate 43, by a pin 47 fixed to and extending between the legs of the bifurcation of the bracket 40, as shown in the dotted line view of the car in Figure 3.

To release the latch from the latch plate as the car is propelled along the track to permit the car body to tilt backward by the weight of passengers seated in the car causing them to assume a backward reclining position and the sensation and thrill of being dumped from the back of the car, the end of the latch opposite to the notched end projects below the frame 6 for engagement by an abutment 48 fixed to and projecting up from a tie member 26, the extended end of the abutment being beveled to permit the lower end of the latch to readily ride thereover after the latch has been released from the plate. The weight of the passengers is so distributed in the body that such weight combined with the pivotal mounting of the body will tilt the body backward upon the releasing of the latch from the latch plate, which tilting movement will be a sudden and unexpected one, and will be stopped abruptly by the engagement of the stops 37 with the abutments 38, thereby jarring the passengers to their great surprise.

To adjust the car from its tilted position to the full line position in Figure 3 and the passengers in upright seated position to unload passengers from the car or prepare them for a further novelty in the ride an arm 49 is mounted on one of the body sides 33 to extend in a downward direction and is offset outwardly from the body, said arm terminating in proximity to and on the outer side of the track rail 13 when the body is in tilted position and carrying a roller 50 adapted to ride upon a cam rail 51 mounted on the tie members 26 at the outer side of the track rail 13 with the highest portion of the cam rail at the end of the rail relative to the direction of travel of the car and of sufficient height to lower the front of the body for the engagement of the latch plate with the notch of the latch.

To prevent jarring of the passengers and injury to the front 32 of the body portion 30 by the colliding of the front of one car with the rear of another a resilient bumper 52 of strap material and of semi-elliptical shape is fixed to the front end of the frame 6 by bending the ends of the bumper inward, as shown in Figure 2.

It will be obvious that various changes may be made in construction and arrangement of parts, and that portions of the invention may be used without others without departing from the scope of the invention.

Having thus described my invention I claim:

1. A passenger carrying car for amusement rides comprising a frame member arranged with traction wheels, motive means carried by the frame and operatively connected to the wheels to propel the same, and a car body pivotally mounted on the frame on an axis transversely of the body and adapted to assume a position by gravity extending in a plane inclining to the frame.

2. A passenger carrying car for amusement rides comprising a frame member arranged with traction wheels, a car body pivotally mounted on the frame on an axis transversely of the body and arranged to assume a position by gravity to extend in a plane inclined to the frame, and means to releasably retain the car body in a position extending parallel to the frame.

3. A passenger carrying car for amusement rides comprising a frame member arranged with traction wheels, a car body pivotally mounted on the frame to have movement on an axis transversely of the body and arranged to assume a position by gravity tilted backward relative to the frame, and abutments carried by the frame to limit the tilting of the body.

4. A passenger carrying car for amusement rides comprising a frame member arranged with traction wheels, a car body pivotally mounted on the frame to have movement on an axis extending transversely of the car, and a latch pivotally carried by the frame to releasably engage a latch plate on the body and retain the body in a predetermined position relative to the frame.

5. A passenger carrying car for amusement rides comprising a frame member arranged with traction wheels, a car body pivotally mounted on the frame to have movement on an axis extending transversely of the frame, a latch plate fixed to and projecting beyond the body, and a latch member pivotally carried by the frame and yieldingly urged into engagement with the plate to releasably retain the body in a predetermined position relative to the frame.

6. A passenger carrying car for amusement rides comprising a frame member arranged with traction means, and a car body pivotally mounted on the frame eccentrically of the transverse center of the body to have movement on an axis extending transversely of the longitudinal axis of the frame.

7. A passenger carrying car for amusement rides comprising a frame member arranged with traction wheels and supports fixed to and extending upwardly from opposed sides of the frame, and a car body pivotally mounted on the supports eccentrically of the transverse axis of the body and adapted to assume a position by gravity to extend in a plane inclining to the frame.

8. In an amusement ride, a track structure, a passenger carrying car comprising a frame member tractionally supported on rails of the track structure, a car body pivotally mounted on the frame to have movement on an axis transversely of the body, and means pivotally carried by the frame to releasably retain the body in a predetermined position relative to the frame, and means fixed to the track structure to actuate said means to release the body to permit the same to assume a position in a plane inclining to the frame.

9. In an amusement ride, a track structure, passenger carrying cars comprising a frame member tractionally supported on rails of the track structure, a car body pivotally mounted to have movement on an axis transversely of the body, a latch pivotally carried by the frame to releasably engage a latch plate on and retain the body in a predetermined position relative to the frame, an arm extending downwardly from the body, an abutment fixed to the track structure to actuate the latch to release the body, and a cam rail extending parallelly of a track rail to be engaged by the body arm when the latch is released to position the body for engagement of the latch plate by the latch.

10. An amusement ride as claimed in claim 9, wherein the cam rail succeeds the abutment relative to the travel of the cars on the rails of the track structure.

11. An amusement ride as claimed in claim 8, wherein the means to releasably retain the body in predetermined position relative to the frame, comprise a latch pivotally carried by the frame and yieldingly urged to engage a latch plate carried by the body.

12. An amusement ride as claimed in claim 9, wherein the latch is arranged at one end with a notch to engage the latch engaging plate on the body and the opposite end projecting downwardly below the frame to be actuated by the abutment, and the body arm carries a roller to engage the cam rail.

13. A passenger carrying car for amusement rides comprising a frame member arranged with traction wheels, and a seat pivotally mounted on the frame to have movement on an axis transversely of the seat and arranged to assume a position by gravity tilted backward relative to the frame.

Signed at Beaver Falls, in the county of Beaver and State of Pennsylvania, this 18th day of May, 1929.

HARRY G. TRAVER.